US009183179B2

(12) United States Patent
Wijffels et al.

(10) Patent No.: US 9,183,179 B2
(45) Date of Patent: Nov. 10, 2015

(54) STABLIZATION METHOD FOR VEHICLES

(71) Applicant: FORD GLOBAL TECHNOLOGIES, LLC, Dearborn, MI (US)

(72) Inventors: Lodewijk Wijffels, Canton, MI (US); Peter Zegelaar, Heerlen (NL); Oliver Nehls, Canton, MI (US); Sergio Codonesu, Heerlen (NL)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 96 days.

(21) Appl. No.: 13/959,806

(22) Filed: Aug. 6, 2013

(65) Prior Publication Data

US 2014/0046539 A1  Feb. 13, 2014

(30) Foreign Application Priority Data

Aug. 7, 2012 (DE) .......................... 10 2012 213 941

(51) Int. Cl.
| G06F 7/00 | (2006.01) |
| G01M 17/00 | (2006.01) |
| G06F 11/30 | (2006.01) |
| G06F 19/00 | (2011.01) |
| G07C 5/00 | (2006.01) |
| G06F 17/00 | (2006.01) |
| B60T 8/1755 | (2006.01) |
| B60T 8/88 | (2006.01) |
| B60G 17/016 | (2006.01) |
| B60G 17/0195 | (2006.01) |

(52) U.S. Cl.
CPC ............ *G06F 17/00* (2013.01); *B60G 17/0164* (2013.01); *B60G 17/0195* (2013.01); *B60T 8/1755* (2013.01); *B60T 8/885* (2013.01); *B60G 2400/39* (2013.01); *B60G 2600/07* (2013.01); *B60G 2800/22* (2013.01); *B60G 2800/94* (2013.01); *B60T 2260/06* (2013.01); *B60T 2270/402* (2013.01)

(58) Field of Classification Search
USPC ........................................ 701/29.2, 36, 37, 92
See application file for complete search history.

(56) References Cited

U.S. PATENT DOCUMENTS

| 2005/0222822 | A1* | 10/2005 | Muramatsu et al. ........... 702/193 |
| 2007/0260783 | A1* | 11/2007 | Combs et al. .................... 710/62 |
| 2011/0066321 | A1* | 3/2011 | Bechtler et al. ................. 701/34 |

* cited by examiner

*Primary Examiner* — Imran Mustafa
(74) *Attorney, Agent, or Firm* — Joseph E. Root

(57) ABSTRACT

Stabilization method and system for performing dynamic chassis control in a vehicle. An electronic stability control (ESC) includes an ESC sensor set; at least one chassis actuator; and a dynamic controller operably connected to at the least one chassis actuator. The ESC sensor set generates one or more sensor fault signals. Then, the method employs a dynamic controller to evaluate the signals corresponding to the sensor fault at least after a first fast fault signal, or a second slow fault signal. If the first fast fault signal is detected, the dynamic controller generates a signal for at least one of partially or completely temporarily switching off the at least one chassis actuator, while maintaining ESC in an active state. Conversely, if the second slow fault signal is detected, the dynamic controller generates a signal for temporarily switching off the ESC.

8 Claims, 2 Drawing Sheets

STABLIZATION METHOD FOR VEHICLES

TECHNICAL FIELD

Embodiments of the present disclosure generally relate to a vehicular stabilization method, and, more particularly, to performing dynamic control of a vehicle.

BACKGROUND

Contemporary vehicles include a number of safety systems. One such system, the Anti-Lock Braking System (ABS), monitors wheel rotation during braking to avoid skidding. In addition, ABS signals may be evaluated by a controller to detect other hazardous situations, arising out of varying road conditions. For example, such signals may allow the controller to detect and thus prevent the vehicle from veering off a designated driving course. Alternatively, the controller may implement selective braking of individual wheels when traction experienced at one wheel differs from the others. As a result, a counteracting yawing torque may stabilize the vehicle, reinstating the driver's control.

Similarly, selective braking systems may address a number of other problems. An array of sensors provides the vehicle controller with real-time information about a number of vehicle states. For example, a steering angle sensor supplies information about the current steering angle. An engine management system, ABS rotational speed sensors, and yaw rate sensors all provide information about vehicle status as changes occur. To aid in stability control, accelerometers may detect rotation about the vehicle's longitudinal axis, thus identifying a rollover risk. The sensors allow the controller to intervene incrementally, before conditions reach an emergency level. Oversteer, for example can be corrected by braking the front wheel on the outside of the curve, and understeer can be similarly corrected by braking the rear wheel on the inside of the curve.

Such processes occur relatively rapidly, as conditions develop, and a safety system much achieve immediate chassis stabilization before the vehicle runs out of control. Chassis stabilization may be combined with automatic braking intervention to form a system referred to as Electronic Stability Control (ESC). When automatic steering intervention is added to ESC, the system is generally referred to as ESC II. Steering intervention allows the vehicle to deal with underlying non-homogenous road conditions, conditions of understeer and oversteer, and similar issues.

A recent improvement in such systems is the employment of chassis actuators. Usually, a combination of a controller and one or more sensors actively control chassis settings. Difficulties arise, however, because sensors may fail during operation. If such a failure goes unnoticed, the vehicle may go out of control. To counter that problem, the industry has deployed fault detection systems designed to detect a faulty sensor and transmit that fact to a corresponding controller for evaluation and an appropriate response. The controller may respond by deactivating automatic stabilization and switching to manual control. In such a case, the fault is detected over a period referred to as the detection time. A relatively high detection time may limit the controller's ability to stabilize the chassis, and therefore, that time must not exceed a long threshold value.

Fault detection reaction times generally range from 250-500 μs. That response suffices for conventional, manual chassis stabilization, but it is too slow for stabilization using chassis actuators. For effective automated control, fault detection reaction time should not exceed 150 μs. That response times is achievable, but it tends to be extremely expensive, given the required circuitry and upgraded equipment requirements for signal evaluation, as well as the further requirement for relatively high quality sensors. In addition, sensors must not only be higher quality than those seen in conventional applications, but they also must be installed in parallel to achieve the required levels of reliability.

Thus, a need remains for rapid fault detection means not only to achieve the performance levels required for automated stabilization, but which can achieve such performance in an efficient manner.

SUMMARY

The present disclosure provides a method for dynamically stabilizing a vehicular chassis.

One aspect of the present disclosure is a stabilization method for performing dynamic chassis control in a vehicle. One portion of that method consists of providing an electronic stability control (ESC) having an ESC sensor set; at least one chassis actuator; and a dynamic controller operably connected to at the least one chassis actuator. The ESC sensor set generates one or more sensor fault signals. Then, the method evaluates the signals that correspond to the sensor fault at least after a first fast fault signal, or a second slow fault signal. If the first fast fault signal is detected, the dynamic controller generates a signal for at least one of partially or completely temporarily switching off the at least one chassis actuator, while maintaining ESC in an active state. Conversely, if the second slow fault signal is detected, the dynamic controller generates a signal for temporarily switching off the ESC.

Another aspect of the present disclosure is a stabilization system adapted to perform a dynamic control in a vehicle. The system comprises at least one chassis actuator mounted and operably connected to the vehicle's chassis, as well as an electronic stability control (ESC) having an ESC sensor set. The ESC sensor set is configured to generate one or more signals by detecting an ESC sensor fault. Additionally, a dynamic controller is operably connected to the ESC, wherein the dynamic controller evaluates the signals that correspond to the sensor fault at least after a first fast fault signal, or a second slow fault signal. If the first fast fault signal is detected, the dynamic controller generates a signal for at least one of partially or completely temporarily switching off the at least one chassis actuator, while maintaining ESC in an active state. On the other hand, if the second slow fault signal is detected, the dynamic controller generates a signal for temporarily switching off the ESC.

BRIEF DESCRIPTION OF THE DRAWINGS

The figure described below sets out and illustrates an exemplary embodiment of the disclosure. Throughout the drawings, like reference numerals refer to identical or functionally similar elements/matter. The drawings are illustrative in nature and not drawn to scale.

DETAILED DESCRIPTION OF ILLUSTRATIVE EMBODIMENTS

The following detailed description includes exemplary embodiments to illustrate the subject matter of the disclosure, not to limit its scope, which is defined by the appended claims.

Overview

In general, the present disclosure provides improved vehicular stabilization through dynamic control, enhancing the reliability of an actively controlled chassis stabilization system through regular and/or periodic fault detection. To this end, the stabilization method evaluates the fault detection signals as being either fast or slow, based on the fault reaction time. The system then generates a signal that either partially or completely switches off at least one active chassis actuator based on the detection of a fast fault signal. Upon the detection of a slow fault signal, in contrast, the system temporarily switches off the entire stabilization system.

Exemplary Embodiments

Undetected sensor faults lead to a situation in which stabilization interventions may be carried out unsuccessfully, and in certain circumstances, an unsuccessful chassis stabilization measure may itself cause a hazardous condition. Such a hazard could be avoided by detecting sensor faults and then deactivating the dynamic control system in full or part.

To achieve rapid response without expensive equipment upgrades, specific detection algorithms can be applied. These algorithms use, for example, two predefined thresholds having different values. In one embodiment, the fault signal may consist of a sequence of signals that fluctuate statistically under a signal noise level. The system can then employ the fault detection reaction time to determine whether the fault signal is classified as fast or slow, depending on two predefined threshold values the fault detection reaction time. Based on that determination, the system can react by disabling an active actuator, effectively switching off the chassis stabilization system while leaving the ESC system operational. The sensitive nature of this analysis may produce a relatively high number of false positive indications. Therefore, analysis continues to determine the seriousness of the detected fault. Algorithms applying the second predefined threshold value produce an analysis having a higher degree of reliability, and if that analysis shows a serious fault, then the entire ESC system is shut off, at least temporarily. Higher reliability comes at the price of slower response, but during that time, the chassis stabilization actuators are not active, minimizing the degree of possible hazard.

Figure 1:
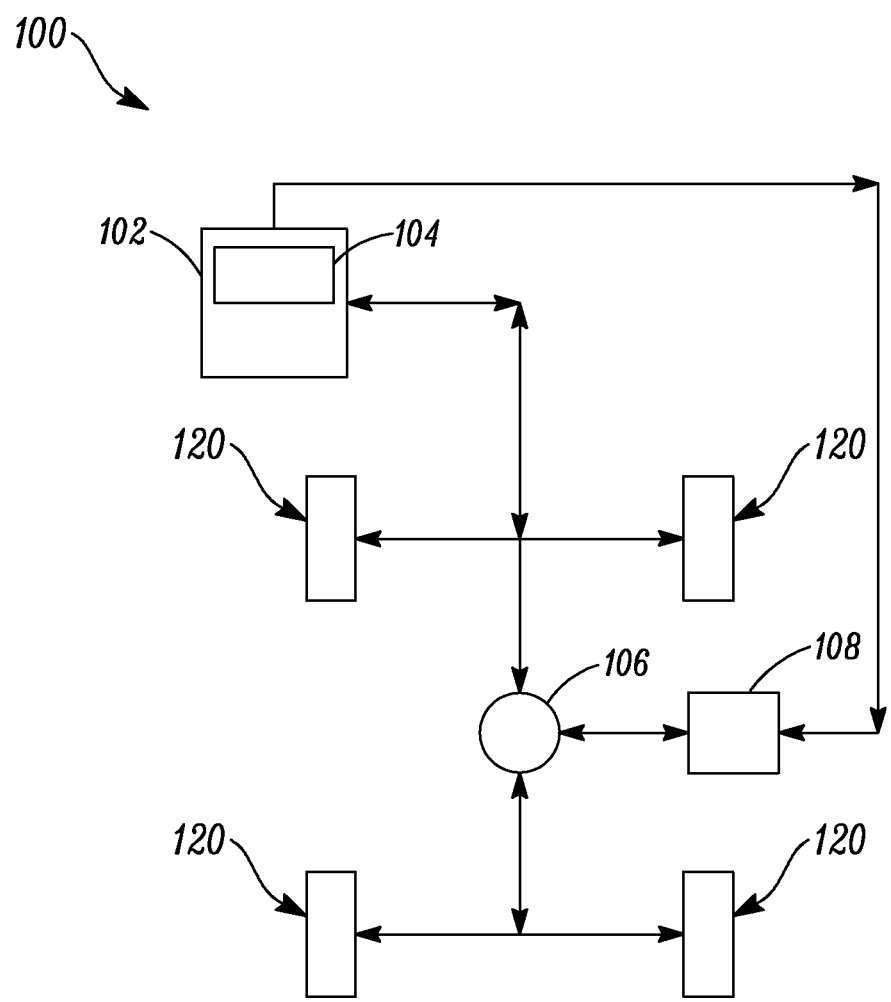
FIG. 1 is an exemplary stabilization system layout according to the present disclosure.

An exemplary vehicle stabilization system 100 is provided in FIG. 1. The system 100 includes an ESC system 102, having an ESC sensor set 104. The system is also connected to the vehicle wheels 120, as shown. The system 100 also includes at least one chassis actuator 106 to carry out specific responsive functions (discussed later). Moreover, the chassis actuator 106 is operably connected to a dynamic controller 108, which is configured to evaluate signals received from the ESC sensor set 104, convert those into readable formats, and deliver them to the chassis actuator 106, producing a suitable response.

The ESC sensor set 104 includes a fault detection unit, which diagnoses fault signals supplied by the sensor set 104. The sensor set 104 can include, but is not limited to, one or more of a steering angle sensor, ABS rotational speed sensors, a yaw rate sensor or an acceleration sensor (such as accelerometers) for sensing a rotation along the vehicle's longitudinal axis, and an engine management sensor. All these sensors can be based on a wide variety of known physical effects or factors. Sensors under discussion here generate specific fault signals when faulty operation is detected.

Faults in such sensors typically occur in situations that may mimic a vehicular instability or raise the system's suspicion of a potential instability risk. Typically, such situations may include steep curves or banked roads, but errors can arise even when the vehicle is merely drifting, or when changing between differing chassis settings. Here, an inappropriate corrective action can have very serious consequences, and therefore the system is highly cautious in accepting information that has even a possibility of being faulty. Thus, when receiving a signal that lies above the first threshold, the system switches off the active chassis actuators while continuing to analyze the situation. That response however, does not adversely affect safety, because the ESC system remains operational.

The chassis actuators 106 may be chosen from those known available to those in the art. Moreover, these actuators may be connected to a vehicle chassis in a known manner. Particularly, the chassis actuator 106 can act to correct a number of chassis properties, such as toe and camber angles, suspension rigidity, transverse-link rods and dampers, ground clearance, actual steering wheel angles, and similar factors. The actuators may include electromechanical or hydraulic devices, active materials such as piezoceramics, thermally or magnetically driven shape memory alloys (SMA), magneto resistive materials, or electro active polymers. These and other devices and materials, now known or hereafter developed, may be deployed as desired by those in the art to control various aspects of an automotive chassis. It will be desirable to select actuators capable of achieving the quickest possible reaction time and mechanical effect to attain a positive dynamic control. In certain preferred refinements, all the disposed active chassis actuators along with their sub functions can be operated individually or in tandem.

The dynamic controller 108 may be any control device capable of performing the function set out in the present disclosure. In some embodiments, controller 108 may form part of an overall control device for the vehicle as a whole. In other embodiments, a specialized chassis stabilization control device can be employed. In either event, controller 108 may be a microprocessor-based device that includes a central processing unit (CPU) for processing incoming signals from known source. The dynamic controller 108 may be provided with volatile memory, such as RAM and/or ROM, together with associated input and output buses. Further, the dynamic controller 108 may also be optionally embodied as an application specific integrated circuit (ASIC), or may be formed through other logic devices well known in the art.

Memory enables data obtained from the sensor set 104 to be retrieved later for inspection and quality improvement purposes. Further, modules that compute values through related algorithms may be included as well.

According to the present disclosure, the signals developed by sensors 104 are evaluated by a first fast fault detection algorithm then by a second slow fault detection algorithm stored within the controller's memory.

In further detail, the first, or fast fault detection algorithm is less sensitive than the second, slow fault detection algorithm, and thus it may generate incorrect fault detection signals. This leads to the generation of false positive indications, identifying more sensor faults than are actually present. On the other hand, the present disclosure makes it possible to avoid the use of additional faster sensors, redundantly operated in parallel, relative to the ESC sensor set. That measure reduces the circuitry and control outlay complexity of the present disclosure, offering further cost savings. Advantageously, a system having simpler design with fewer sub-elements is less prone to failures. In sum, substituting software for hardware produces excellent results at considerably reduced cost.

The second fault detection algorithm seeks to determine whether a fault is actually present, which requires additional time. Thus, rather than simply reacting to a fault signal, the second fault detection algorithm will compare the signal from the suspect sensor with signals from other sensors that measure the same or related events. Here, readings from several sensors can be correlated to determine whether the suspect sensor reading falls within an expected range or is clearly an outlier, indicating an actual fault. Chassis operation produces a set of sensor signals that are related to one another, so correlation and reference to similarly placed sensors will be useful to identify problems and a suspect sensor. Updated to support such analysis can be stored in volatile memory or in lookup tables stored in ROM or the like. This analysis requires processing time, supported by programming, but that cost is considerably lower than the cost of providing redundant hardware.

Figure 2:
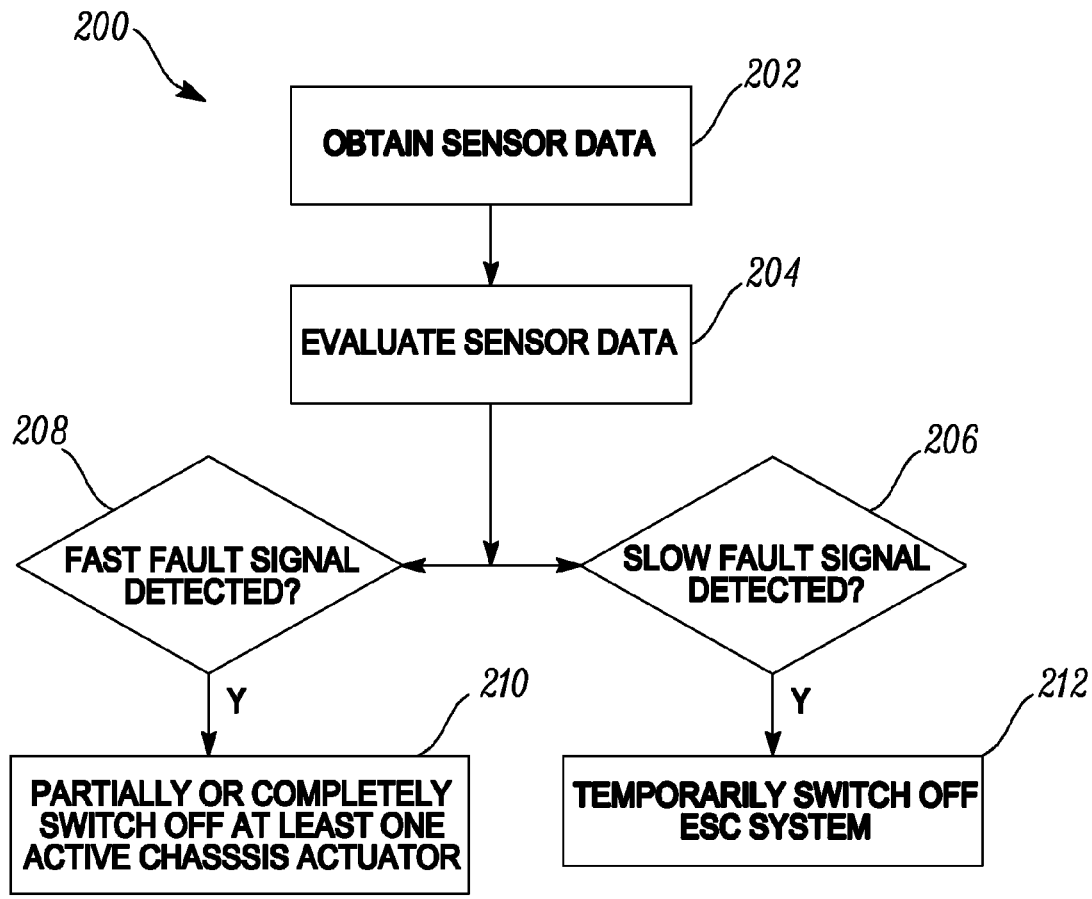
FIG. 2 is a flowchart setting out an exemplary method of the system of FIG. 1.

The system set out above is further discussed through a method, and thus, exemplary operational stages of the system 100 are set out below, and are best described through the flowchart of FIG. 2.

The method 200 begins at step 202, where the system 100 receives or obtains the sensor information or data. That data may take the form of a readily compatible and readable signal. Before processing the received signal, the dynamic controller 108 briefly evaluates the signal (step 204) to determine whether it corresponds to a fast fault signal or a slow fault signal. This characterization differentiates the first fast fault detection algorithm by means of a predefined fault detection period of 200 to 350 µs, and the second slow fault detection algorithm by a predefined fault detection time of 350 to 500 µs.

Then, the dynamic controller 108 may process this evaluated signal through a specific algorithm. The dynamic controller 108 partially or completely switches off at least one active chassis actuator when a fast fault signal is detected (steps 208 and 210). On the other hand, when it is detected that the signals are slow fault signals, the dynamic controller 108 temporarily switches off the ESC system 102 (stage 206 and 212).

Thereafter, a partial or complete activation of the at least one active chassis actuator or of a sub-function of that actuator, is brought about when a fast or quickly detected fault signal subsequently fails to occur. In this manner, the dynamics controller 108 returns to the original state of using the fast-acting active chassis actuator system alone, and is advantageously left undetected by the driver. The failure of the fast fault signal to occur is recorded, preferably, over a predefined period.

According to an advantageous refinement, the controller senses the fault signal of a particular sensor after it receives a signal having a first predefined low threshold value. At that point, the analysis is assigned to the fast fault detection algorithm.

In case of electronic elements, the physical measurement variable is usually an electrical voltage, but that may be replaced with other electrical variables, for example, pulse frequency, pulse width, or the like. In further refinements, the fault signal can also be sensed after a second predefined relatively high threshold value of its physical measurement variable, and can be assigned to the second slow fault detection algorithm.

Therefore, fast and slow detection algorithms are implemented alternatively. In particular, the two threshold values are selected in such a way that the relatively low threshold value permits more sensitive, fast fault detection, and the relatively high threshold value permits more reliable, slow fault detection.

The stabilization method according to the present disclosure provides further practical advantages. For example, if the system switches off at least one active chassis actuator or a sub function, the sensor or sensors are reset to a predefined normal setting. That measure prevents the chassis actuators to remain in an undefined setting, or a setting that is set last and which is optimal only for a particular driving situation, but disadvantageous in other driving situations.

In further preferred refinements, in case a fault is detected via the second slow fault detection algorithm, the ESC system is also switched off. As a result, the stabilization method optionally implements an operation with the ESC and active chassis actuators, or an operation with ESC alone, or an operation entirely without the dynamics control.

To avoid overloading the driver with distracting information, a fault message is provided to the driver only if the ESC system is switched off. Previously executed chassis actuator deactivations may be however communicated to the driver, but that may remain optional as the ESC still remains operational in that stage, and performs its functions in an uninterrupted manner.

Alternatively, the fault messages for the driver can be output in the form of visual light signals within the dashboard region, steering wheel region, or on a feedback device such as a display interface. Optionally, an acoustic signal or a voice output may be contemplated as well.

Certain components described in the application may function independently of each other, and thus, none of the implementations needs to be seen as being restricted to the disclosed environment alone. Further, it may be well known to those in the art that the description of the present disclosure may be applicable to a variety of other environments as well, and thus, the environment disclosed herein must be viewed as being purely exemplary.

The description illustrates aspects and embodiments of the subject matter and its implementation. This description should not be understood as defining or limiting the scope of the present disclosure, however, such definition or limitation being solely contained in the claims appended thereto. Although the best mode of carrying out the subject matter has been disclosed, those in the art would recognize that other embodiments for carrying out or practicing the subject matter are also possible.

Accordingly, those skilled in the art will understand that variations in these embodiments will naturally occur in the course of embodying the subject matter of the disclosure in specific implementations and environments. It will further be understood that such variations will fall within the scope of the disclosure. Neither those possible variations nor the specific examples disclosed above are set out to limit the scope of the disclosure. Rather, the scope of claimed subject matter is defined solely by the claims set out below.

What is claimed is:

1. A stabilization method for performing dynamic chassis control in a vehicle, the method comprising:
providing an electronic stability control (ESC) having an ESC sensor set; at least one chassis actuator; and a dynamic controller operably connected to each chassis actuator, wherein the ESC sensor set generates one or more sensor fault signals;
evaluating a sensor fault signal with the dynamic controller, including:
classifying the sensor fault signal as a fast fault signal if the detection period for the signal lies within a first pre-defined fault detection period range, or a slow fault signal if the detection period for the signal lies within a second pre-defined fault detection period range;
if the fault signal is a fast fault signal generating a signal for partially or completely temporarily switching off the chassis actuator associated with the fault signal, while maintaining ESC in an active state; and
if the fault signal is a slow fault signal generating a signal for temporarily switching off the ESC.

2. The method of claim 1, wherein the first predefined detection period range is 250 to 350 μs.

3. The method of claim 1, wherein the second predefined detection period range is 350 to 500 μs.

4. A stabilization system to perform a dynamic control in a vehicle, the system comprising:
at least one chassis actuator mounted and operably connected to the vehicle's chassis;
an electronic stability control (ESC) having an ESC sensor set including a plurality of sensors mounted on the vehicle chassis and associated components, each sensor configured to generate a signal upon detecting a chassis or component fault;
a dynamic controller operably connected to the ESC, wherein the dynamic controller evaluates the sensor fault signals, the controller being configured for:
classifying the sensor fault signal as a fast fault signal if the fault detection period for the signal lies within a first pre-defined fault detection period range, and temporarily switching off the chassis actuator associated with the fault signal, either partially or completely, while maintaining ESC in an active state; and
during a preselected time period after identifying a fast fault signal, correlating and comparing the fast fault signal with signals from related sensors, and if the comparison and correlation fulfills preselected criteria, and if the fault detection period for the signal lies within a second pre-defined fault detection period range then classifying the fault signal as a slow fault signal, and-generating a signal for temporarily switching off the ESC.

5. The system of claim 4, wherein the first predefined detection period range is 250 to 350 μs.

6. The system of claim 4, wherein the second slow fault signal implies a signal detection in range of 350 to 500 μs.

7. The method of claim 1, wherein the cutoff value is about 350 μs.

8. The method of claim 4, wherein the cutoff value is about 350 μs.

* * * * *